US011907678B2

(12) United States Patent
Wang et al.

(10) Patent No.: US 11,907,678 B2
(45) Date of Patent: Feb. 20, 2024

(54) CONTEXT-AWARE MACHINE LANGUAGE IDENTIFICATION

(71) Applicant: International Business Machines Corporation, Armonk, NY (US)

(72) Inventors: Fan Wang, Suzhou (CN); Li Cao, Beijing (CN); Rui Wang, Xian (CN); Lei Gao, Xian (CN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 17/093,879

(22) Filed: Nov. 10, 2020

(65) Prior Publication Data

US 2022/0147720 A1 May 12, 2022

(51) Int. Cl.

| | |
|---|---|
| ***G06F 40/45*** | (2020.01) |
| ***G06F 40/51*** | (2020.01) |
| ***G10L 15/26*** | (2006.01) |
| ***G06F 40/30*** | (2020.01) |
| ***G06F 40/284*** | (2020.01) |
| ***G06F 40/58*** | (2020.01) |

(52) U.S. Cl.

CPC ............ *G06F 40/58* (2020.01); *G06F 40/284* (2020.01); *G06F 40/30* (2020.01); *G06F 40/45* (2020.01); *G06F 40/51* (2020.01); *G10L 15/26* (2013.01)

(58) Field of Classification Search

None

See application file for complete search history.

(56) References Cited

U.S. PATENT DOCUMENTS

| | | | |
|---|---|---|---|
| 5,136,503 | A | 8/1992 | Takagi |
| 7,512,712 | B2 | 3/2009 | Kim et al. |
| 8,126,698 | B2 | 2/2012 | Washizawa et al. |
| 8,386,265 | B2 | 2/2013 | Subramanian et al. |

(Continued)

FOREIGN PATENT DOCUMENTS

| | | | |
|---|---|---|---|
| CN | 101075435 | A | 11/2007 |
| CN | 101984435 | A | 3/2011 |

(Continued)

OTHER PUBLICATIONS

Meng, I-Heng, et al. "The design and implementation of chinese question and answering system." Computational Science and Its Applications—ICCSA 2003: International Conference, Springer Berlin Heidelberg, 2003, pp. 601-613 (Year: 2003).*

(Continued)

*Primary Examiner* — Jesse S Pullias
*Assistant Examiner* — Michael C. Lee
(74) *Attorney, Agent, or Firm* — Grant Johnson

(57) ABSTRACT

A machine translation system, a ChatOps system, a method for a context-aware language machine identification, and computer program product. One embodiment of the machine translation system may include a density calculator. The density calculator may be adapted to calculate a part of speech (POS) density for a plurality of word tokens in an input text, calculate a knowledge density for the plurality of word tokens, and calculate an information density for the plurality of word tokens using the POS density and the knowledge density. In some embodiments, the machine translation system may further comprise a sememe attacher and a context translator.

10 Claims, 7 Drawing Sheets

(56) References Cited

U.S. PATENT DOCUMENTS

| | | | | |
|---|---|---|---|---|
| 8,612,203 | B2 | 12/2013 | Foster et al. | |
| 9,201,927 | B1 * | 12/2015 | Zhang | G06F 40/30 |
| 9,400,838 | B2 * | 7/2016 | Musgrove | G06F 16/951 |
| 9,852,379 | B2 * | 12/2017 | Beigman Klebanov | G06N 7/005 |
| 9,934,203 | B2 | 4/2018 | Bahgat et al. | |
| 9,965,460 | B1 * | 5/2018 | Wasiuk | G06F 40/295 |
| 2003/0028367 | A1 * | 2/2003 | Chalabi | G06F 40/268 704/4 |
| 2007/0011154 | A1 * | 1/2007 | Musgrove | G06F 40/30 707/999.005 |
| 2009/0306967 | A1 * | 12/2009 | Nicolov | G06Q 30/02 704/9 |
| 2011/0258194 | A1 | 10/2011 | Yang | |
| 2014/0040275 | A1 * | 2/2014 | Dang | G06F 16/2228 707/741 |
| 2014/0081626 | A1 * | 3/2014 | Chang | G06F 40/247 704/9 |
| 2014/0229155 | A1 | 8/2014 | Leydon | |
| 2019/0288962 | A1 * | 9/2019 | Miyata | G06F 3/1203 |
| 2020/0151219 | A1 | 5/2020 | Anand et al. | |
| 2020/0302127 | A1 * | 9/2020 | Liu | G06N 3/044 |
| 2021/0391075 | A1 * | 12/2021 | Marks | G16H 10/60 |
| 2022/0318509 | A1 * | 10/2022 | Dai | G06F 40/30 |

FOREIGN PATENT DOCUMENTS

| | | | |
|---|---|---|---|
| CN | 102622342 | A | 8/2012 |
| CN | 104933149 | A | 9/2015 |
| CN | 105408891 | A | 3/2016 |
| CN | 107526834 | A | 12/2017 |
| CN | 109800308 | A | 5/2019 |
| CN | 110321568 | A | 10/2019 |
| CN | 114462415 | A | 5/2022 |
| JP | 2022077022 | A | 5/2022 |
| TW | 201135479 | A | 10/2011 |
| WO | 9007159 | A1 | 6/1990 |
| WO | 2018203935 | A1 | 11/2018 |

OTHER PUBLICATIONS

Zhu, Honglei, et al. "Query translation selection for cross-language information retrieval based on HowNet." 2008 International Conference on Natural Language Processing and Knowledge Engineering. IEEE, 2008, pp. 1-6 (Year: 2008).*

Zhou, Qiaoli, et al. "Incorporating HowNet-Based Semantic Relatedness Into Chinese Word Sense Disambiguation." Chinese Lexical Semantics: 20th Workshop, CLSW 2019, Beijing, China, Jun. 28-30, 2019, Springer International Publishing, (Jan. 4, 2020), pp. 359-370 (Year: 2020).*

"Become a ChatOps advocate" IBM Cloud, Printed Sep. 15, 2020, 3 pages https://www.ibm.com/cloud/architecture/content/course/chatops-advocate/what-is-chatops/.

Averdunk, "Collaborate by using ChatOps," IBM, Printed Sep. 15, 2020, 3 pages https://www.ibm.com/garage/method/practices/manage/chatops.

Feng et al., "Memory-augmented Neural Machine Translation," arXiv:1708.02005v1 [cs.CL], Aug. 7, 2017, 10 pages, https://arxiv.org/pdf/1708.02005.pdf.

Tan et al., "Hierarchical Modeling of Global Context for Document-Level Neural Machine Translation," Proceedings of the 2019 Conference on Empirical Methods in Natural Language Processing and the 9th International Joint Conference on Natural Language Processing, Nov. 3-7, 2019, 10 pages, https://www.aclweb.org/anthology/D19-1168.pdf.

Zheng et al., "Toward Making the Most of Context in Neural Machine Translation," arXiv:2002.07982v1 [cs.CL], Feb. 19, 2020, 8 pages, https://arxiv.org/pdf/2002.07982v1.pdf.

Carbonell et al., "Context-Based Machine Translation," Proceedings of the 7th Conference of the Association for Machine Translation in the Americas, Aug. 2006, 10 pages, http://www.cs.cmu.edu/~jgc/publication/Context_Based_Machine_AMTA_2006.pdf.

Niu et al., "Improved Word Representation Learning with Sememes," Proceedings of the 55th Annual Meeting of the Association for Computational Linguistics, Jul. 30-Aug. 4, 2017, 10 pages, https://www.aclweb.org/anthology/P17-1187.pdf, https://doi.org/10.18653/v1/P17-1187.

Du et al., "Lexical Sememe Prediction using Dictionary Definitions by Capturing Local Semantic," arXiv:2001.05954v1 [cs.CL], Jan. 16, 2020, 9 pages, https://arxiv.org/pdf/2001.05954.pdf.

Wang et al., "Exploiting Cross-Sentence Context for Neural Machine Translation," arXiv:1704.04347v3 [cs.CL], Jul. 23, 2017, 6 pages, https://arxiv.org/pdf/1704.04347.pdf.

Jean et al., "Context-Aware Learning for Neural Machine Translation," arXiv:1903.04715v1 [cs.CL], Mar. 12, 2019, 7 pages, https://arxiv.org/pdf/1903.04715.pdf.

Luo et al., "Unsupervised Neural Aspect Extraction with Sememes," Proceedings of the Twenty-Eighth International Joint Conference on Artificial Intelligence (IJCAI-19), Aug. 16, 2019, 7 pages, https://www.ijcai.org/Proceedings/2019/0712.pdf.

Mell et al., "The NIST Definition of Cloud Computing," Recommendations of the National Institute of Standards and Technology, U.S. Department of Commerce, Special Publication 800-145, Sep. 2011, 7 pages.

Qike, Li, "Research on Indian English-Chinese Neural Machine Translation With Language Features", English Abstract, Dec. 2019, Dissertation, Part 1, 35 pages.

Qike, Li, "Research on Indian English-Chinese Neural Machine Translation With Language Features", English Abstract, Dec. 2019, Dissertation, Part 2, 39 pages.

Toral, Antonio, "Post-editese an Exacerbated Translationese", arXiv:1907.00900v2 [cs.CL] Oct. 3, 2019, 10 pages.

Xiong et al., "A Survey of Syntax-based Statistical Machine Translation", English Abstract, Journal of Chinese Information Processing, vol. 22, No. 2, Mar. 2008, 12 pages.

* cited by examiner

CONTEXT-AWARE MACHINE LANGUAGE IDENTIFICATION

BACKGROUND

The present disclosure relates to natural language processing, and more specifically, to natural language processing for a conversational system.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

Natural language processing is one well-known application of these improved capabilities. Today, many users encounter applications, such as virtual agents and chat bots, that provide a natural language interface to local and Internet content. These applications may employ dialog prompts to interact with end users for fulfilling goal-oriented tasks, such as online transactions.

While such applications offer great potential value, they are limited in the types of information and assistance that they provide due to the deficiencies in the natural language understanding by the applications and the difficulty in generating an interface for every potential user desire. Therefore, these systems usually limit the dialog prompts to direct and static responses to user requests, and often fail to provide proper context or explanation as to why the system response was produced. Moreover, unless anticipated by the system designer, a chat bot will often lack the ability for addressing particular items within the end users' feedback.

Wang et al. (2017) describes a method for exploiting cross-sentence context for neural machine translation. It proposes a cross-sentence, context-aware approach and investigates the influence of historical contextual information on the performance of neural Machine translation (NMT). First, this history is summarized in a hierarchical way. Then, it integrates the historical representation into NMT in two strategies: 1) a warm-start of encoder and decoder states, and 2) an auxiliary context source for updating decoder states.

SUMMARY

According to embodiments of the present disclosure, a machine translation system, comprising a density calculator. The density calculator may be adapted to calculate a part of speech (POS) density for a plurality of word tokens in an input text, calculate a knowledge density for the plurality of word tokens, and calculate an information density for the plurality of word tokens using the POS density and the knowledge density. In some embodiments, the density calculator may be further adapted to tokenize the input text into the plurality of word tokens, level the knowledge density by POS, and return the word information density for the plurality of word tokens. In some embodiments, the system may further comprise a sememe attacher adapted to generate one or more corresponding sememes for one or more of the plurality of word tokens using their respective POS density and knowledge density, and attach the one or more corresponding sememes to the one or more word tokens. In some embodiments, the machine translation system may further comprise a context translator adapted to divide the input text into a plurality of smaller chunks by stop words, the plurality of smaller chunks including one or more word tokens having one or more corresponding sememes attached thereto, generate a semantic context for one or more of the smaller chunks using the one or more corresponding sememes, and translate the input text using the semantic context.

According to embodiments of the present disclosure, a ChatOps system comprising a plurality of client devices and a machine translation system operably connected to the plurality of client devices. The machine translation system in some embodiments may comprise a density calculator, a sememe attacher, and a context translator. The density calculator may be adapted to tokenize an input text into the plurality of word tokens, calculate a part of speech (POS) density for a plurality of word tokens in the input text, calculate a knowledge density for the plurality of word tokens, wherein the knowledge density is leveled by POS, calculate an information density for the plurality of word tokens using the POS density and the knowledge density, and return the word information density for the plurality of word tokens. The sememe attacher may be adapted to lemmatize the input text, generate one or more corresponding sememes under the POS for one or more of the plurality of word tokens using their respective POS density and knowledge density, attach the one or more corresponding sememes to the one or more word tokens, and return a list of sememes for the plurality of word tokens. The context translator may be adapted to divide the input text into a plurality of smaller chunks by stop words, the plurality of smaller chunks including one or more word tokens having one or more corresponding sememes attached thereto, cluster the one or more word tokens using the corresponding sememes, determine a sense for the clustered word tokens, merge the sense with the corresponding sememes to generate a semantic context for one of the chunks, use the semantic context to translate the plurality of smaller chunks into a target language, and return the translation for the input text.

According to embodiments of the present disclosure, a method for a context-aware language machine identification. One embodiment may comprise enabling a density calculator to determine a word's information density by parts of speech (POS) density and knowledge density, enabling a sememe attacher to select and attach corresponding sememes list to the word using its POS density and knowledge density, and enabling a context translator to divide a input text into smaller chunks by stop words, and to translate smaller chunks using a semantic context associated with the corresponding sememes.

According to embodiments of the present disclosure, a computer program product for a machine translation system, the computer program product comprising a computer readable storage medium having program instructions embodied therewith. The program instructions may be executable by a processor to cause the processor to calculate a part of speech POS density for a plurality of word tokens in an input text, calculate a knowledge density for the plurality of word tokens, and calculate an information density for the plurality of word tokens using the POS density and the knowledge density.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
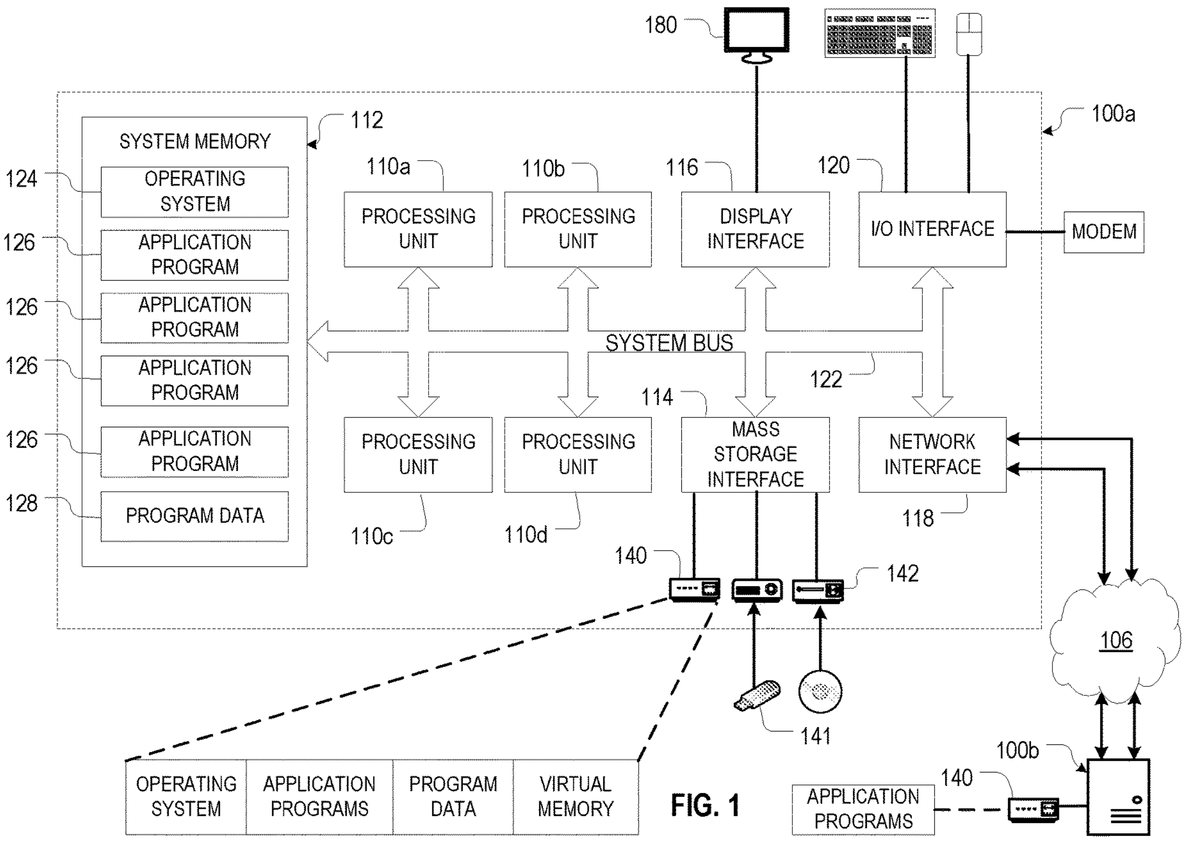
FIG. 1 illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing; more particular aspects relate to natural language processing for a conversational system. While the present disclosure is not necessarily limited to such applications, various aspects of the disclosure may be appreciated through a discussion of various examples using this context.

Precision machine translation generally refers to a field of computational linguistics that investigates the use of software to translate text from one natural language to another. There are two major types of precision machine translation. The first major type of machine translation is rule-based machine translation, which uses a combination of language and grammar rules plus dictionaries for common words to translate the corpora from one language to another (a corpora is the plural version of corpus which is a collection of written texts, especially the entire works of a particular author or a body of writing on a particular subject). Rule-based systems may be further categorized as using word embeddings to provide a representation that is able to capture similarities, and an attention mechanism to determine the importance of each word to extract additional context around each word.

The other major type of machine translation is statistical machine translation; this type of machine translation has no knowledge of language rules. Instead, statistical machine translation "learns" to translate by analyzing large amounts of data for the source and target language, including, but not limited to, bilingual and monolingual text. Both major types of precision machine translation can produce similar results; however, statistical machine translation may deliver more fluent sounding translation, but at the cost of being less consistent with the translations.

At the core of the technology, precision machine translation substitutes words and phrases in one natural language for words and phrases in another language. However, this core alone often cannot produce a quality translation of text because the context of a word or phrase affects how it should be translated. For example, consider the following sentence:

Example 1A:

Human: "Translate 'Use a fluffy roller barely dipped in lighter paint to delicately roll over the dark wall.'"

A naive system may translate the sentence into Chinese as:

Example 1B:

Computer: 使用蓬松的滚筒， 几乎不浸在较轻的油漆，细腻地滚动在黑暗的墙壁"

or as:

Example 1C:

Computer: 用一个毛茸茸的滚筒轻轻地蘸上浅色的油漆，在黑暗的墙壁上轻轻地滚，动"

These translations, however, are of poor quality, as the context of the statement was about using roller to paint the wall. In Example 1B, the word "light" can describe "brighter" or "paler" as in color and "less heavy" as in weight. The translation 较轻 is for weight. 细腻 describes things to be "fine," "smooth" or "people to be sensitive with perceptive feelings." Here, the translation should use the meaning of requiring sensitive or careful handling. In Example 1C, 毛茸茸 is largely equivalent to furry, which is not ideal for describing a tool. The literal translation of 黑暗的墙壁 is dark wall, but 黑暗 is more characterized by tragedy, unhappiness, or unpleasantness, and not in color as not reflecting much light or approaching black in shade, which makes 深色 a more suitable choice. A better translation, one that uses context, might be, based on the above:

Example 1D:

Computer: "使用蓬松柔软的滚筒轻蘸浅色油漆，在深色墙壁上仔细抹平"

"ChatOps" is one illustrative application of precision machine translation. ChatOps generally refers to a collaboration model that connects people, tools, process, and automation into a transparent work-flow, such as information technology (IT) management. This model can connect the work that is needed, the work that is happening, and the work that was done in a persistent location that is staffed by people, bots, and related tools. ChatOps may be used in a wide variety of fields, including Information Technology (IT), product development, product support, government, healthcare, law, and finance.

Team members may type both commands and comments into a chat room in the ChatOps system, which they may access using their respective client devices (e.g., personal computers, smartphones, tablets, etc.) The ChatOps system, in turn, may be configured to identify and run the commands through custom scripts and plug-ins. In the IT field, for example, the commands can range from code deployments to security event responses to team member notifications. As an illustrative example conversation from the IT space, an administrator of a system may type:

Example 2A

Human: "/h deploy paipu to staging"
and the computer may reply:

Example 2B

Computer: "Deployed paipu-app-staging"
Computer: "heroku/paipu-repo-ref: master-SHA: 576d16a9-duration: 43 s"
Advantageously, ChatOps may allow the entire team to collaborate as commands are run. In this way, ChatOps is part of the shift toward a more collaborative way to perform operations. In particular, ChatOps may use collaboration tools to create an environment where subject matter experts (SMEs) and other stakeholders can literally be "on the same page" as it relates to an ongoing issue. Thus, for example, instead of using a traditional help ticket tool, SMEs (including security, network, and infrastructure experts) may use persistent instant messaging tools to communicate with each other and with the tools that they use to do their jobs.

Many ChatOps deployments, and potential deployments, may benefit from high machine translation accuracy i.e., the system can distinguish user requests from text chat and convert them to the proper executable commands. While some ChatOps deployments may be able to utilize word vectors and aliases to provide the desired accuracy, other deployments may need to process large amounts of parallel data and/or to match rules that are often both rigid and include options with similar meaning. In this latter category, some ChatOps deployments may utilize neural machine translation to adjust its translating strategy to the current semantic context. For example:

Example 3

HUMAN: I want to end jobs in the risk group 106.
COMPUTER: bkill -g /risk_group 106 (i.e., kill jobs in risk_group 106)
HUMAN: But I mean to end for a while not to kill.
COMPUTER: bstop -g /risk_group 106 (i.e., suspend jobs in risk_group 106)
The first proposed command would have been an improper translation, as judged by the end user's intent. The computer in this example, however, was able to produce the proper command in response to the correction from the user, as well as tie multiple statements from that user together, via context.

More generally, with rapid development in recent years, neural machine translation (NMT) may outperform traditional models in many cases, but may lack an approach to be context-aware to know under which scenario the text is put. How to identify context-specific textual intent with high precision is and will be more acute, as language identification tasks deal with more complex or delicate situations.

Accordingly, aspects of this disclosure may include a language identification method to support neural machine translation with the feature to detect and update semantic context using sememes that represent units of meaning, instead of only storing or labeling global context as corpora training results. In this way, some embodiments may provide the ability to deal with the accuracy of sentential semantic context.

When a translation task is initiated, some embodiments first determine a sentence information density by parts of speech (POS) density and a knowledge density of each word for an input text. Some embodiments then analyze domain-specific sememes, add their senses as a new dimension to enhance word vectors, and select corresponding sememes for each word token with higher density. The input text may be divided into chunks by stop words, and the attached sememes may be translated to the semantic context and added as a header to the context vector to assist neural machine translation.

Some embodiments may include a method that supports neural machine translation with information density analysis, sememes selection with word vector enhancement, and semantic context translation. Some of these embodiments may utilize three modules: a density calculator, a sememe attacher, and a context translator. The associated method may also be separated into three stages. In the first stage, some embodiments may tokenize the text and define a parts of speech (POS) density by POS, define a knowledge density of each word token by their importance as in a knowledge field, and merge the POS density with the knowledge density as a merged density. In the second stage, domain-specific sememes may be analyzed and added as a new dimension to word vectors, while sememes are attached to the word token by POS and knowledge density. In the third stage, some embodiments may merge senses of the concerned sememes and update the semantic context at stop words.

Data Processing System

FIG. 1 illustrates an embodiment of a data processing system (DPS) 100*a*, consistent with some embodiments. The DPS 100*a* in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100*a*, and individual components may have greater complexity than represented in FIG. 1.

The DPS 100*a* in FIG. 1 comprises a plurality of central processing units 110 *a*-110 *d* (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100*a* to communicate with other DPS 100*b* over the communications medium 106. The memory 112 also contains an operating system 124, a plurality of application programs 126, and program data 128.

The DPS 100*a* embodiment in FIG. 1 is a general-purpose computing device. Accordingly, the processors 110 may be any device capable of executing program instructions stored in the memory 112 and may themselves be constructed from one or more microprocessors and/or integrated circuits. In this embodiment, the DPS 100*a* contains multiple processors and/or processing cores, as is typical of larger, more capable computer systems; however, in other embodiments the DPS 100*a* may comprise a single processor system and/or a single processor designed to emulate a multiprocessor system. Further, the processors 110 may be implemented using a number of heterogeneous DPS 100*a* in which a main processor is present with secondary processors on a single chip. As another illustrative example, the processor 110 may be a symmetric multiprocessor system containing multiple processors of the same type.

When the DPS 100*a* starts up, the associated processor(s) 110 initially execute the program instructions that make up the operating system 124, which manages the physical and logical resources of the DPS 100*a*. These resources include the memory 112, the mass storage interface 114, the terminal/display interface 116, the network interface 118, and the system bus 122. As with the processor(s) 110, some DPS 100*a* embodiments may utilize multiple system interfaces 114, 116, 118, 120, and buses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 1, the instructions are stored in a functional form of persistent storage on the direct access storage device 140. These instructions are then loaded into the memory 112 for execution by the processor 110. However, the program code may also be located in a functional form on the computer readable media that is selectively removable and may be loaded onto or transferred to the DPS 100*a* for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 1 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100*a* to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS e.g., DPS 100*b*.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units, such as monitor 180, to the DPS 100*a*. These display units 180 may be non-intelligent (i.e., dumb) terminals, such as an LED monitor, or may themselves be fully programmable workstations used to allow IT administrators and customers to communicate with the DPS 100*a*. Note, however, that while the display interface 116 is provided to support communication with one or more display units 180, the DPS 100*a* does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100*a*, 100*b*. Accordingly, the network interfaces 118 can be any device that facilitates such communication, regardless of whether the network connection is made using present day analog and/or digital techniques or via some networking mechanism of the future. Suitable communication media 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Cloud Computing

Figure 2:
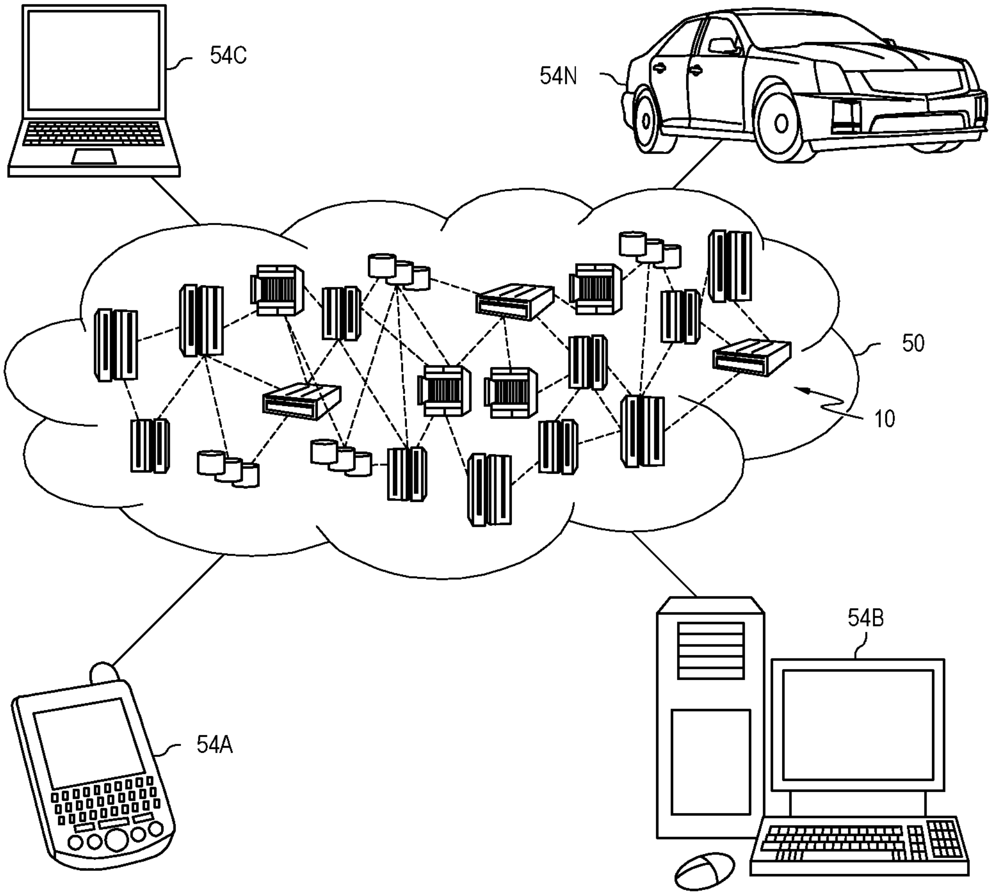
FIG. 2 depicts a cloud computing environment, consistent with some embodiments.

FIG. 2 illustrates a cloud environment containing one or more DPS 100*a*, 100*b* consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
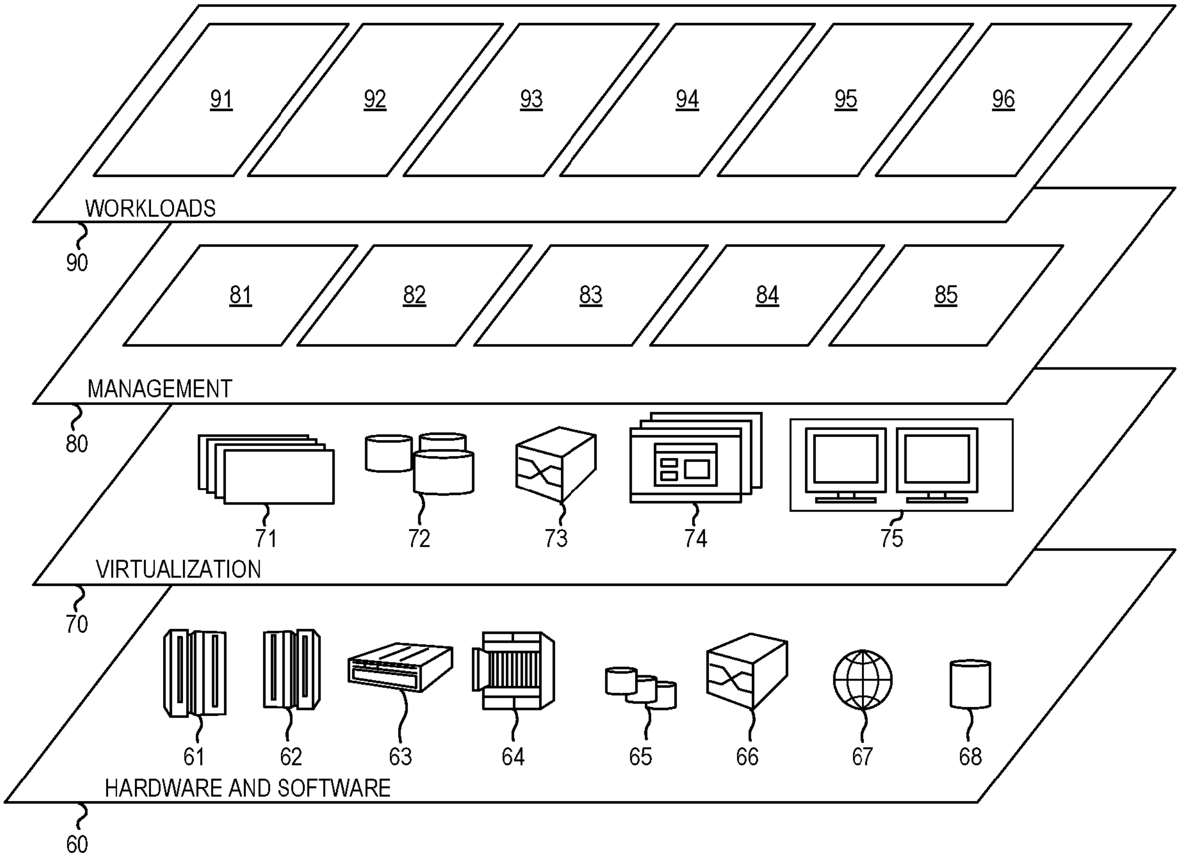
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a language identification service 96.

Language Identification System

Figure 4:
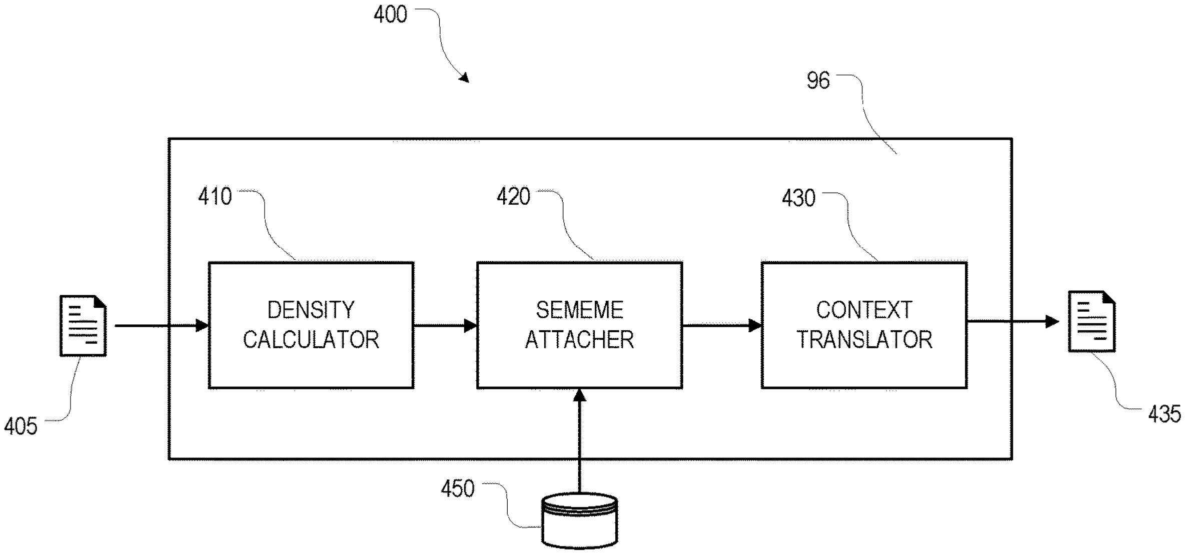
FIG. 4 is a high level system diagram for a language identification service, consistent with some embodiments.

FIG. 4 is a high level system diagram 400 for a language identification service 96, consistent with some embodiments. The language identification service 96 in FIG. 4 includes a density calculator 410, a sememe attacher 420, and a context translator 430. In operation, input text 405 in a first language may be input into the language identification service 96 by an end user and/or by another computer process (e.g., ChatOps, translation service, etc.) The density calculator 410 may evaluate the input text, word by word, to generate a POS density score and a knowledge density score. The POS density and the knowledge density may be combined to form a weighted density score.

The sememe attacher may then find one or more sememes for the word(s) having a POS density and/or knowledge density above a threshold score and/or above an average weighted density score for the input text. This may include looking up the selected word(s) using a sememe dictionary database 450. The context translator 430 may generate and/or update a context for the input text using the sememes. The context translator 430 may then output a translated version of the input text 435 in a second language, different from the first language, to the user or process that submitted the input text using the generated/updated context.

Density Calculator

Figure 5:
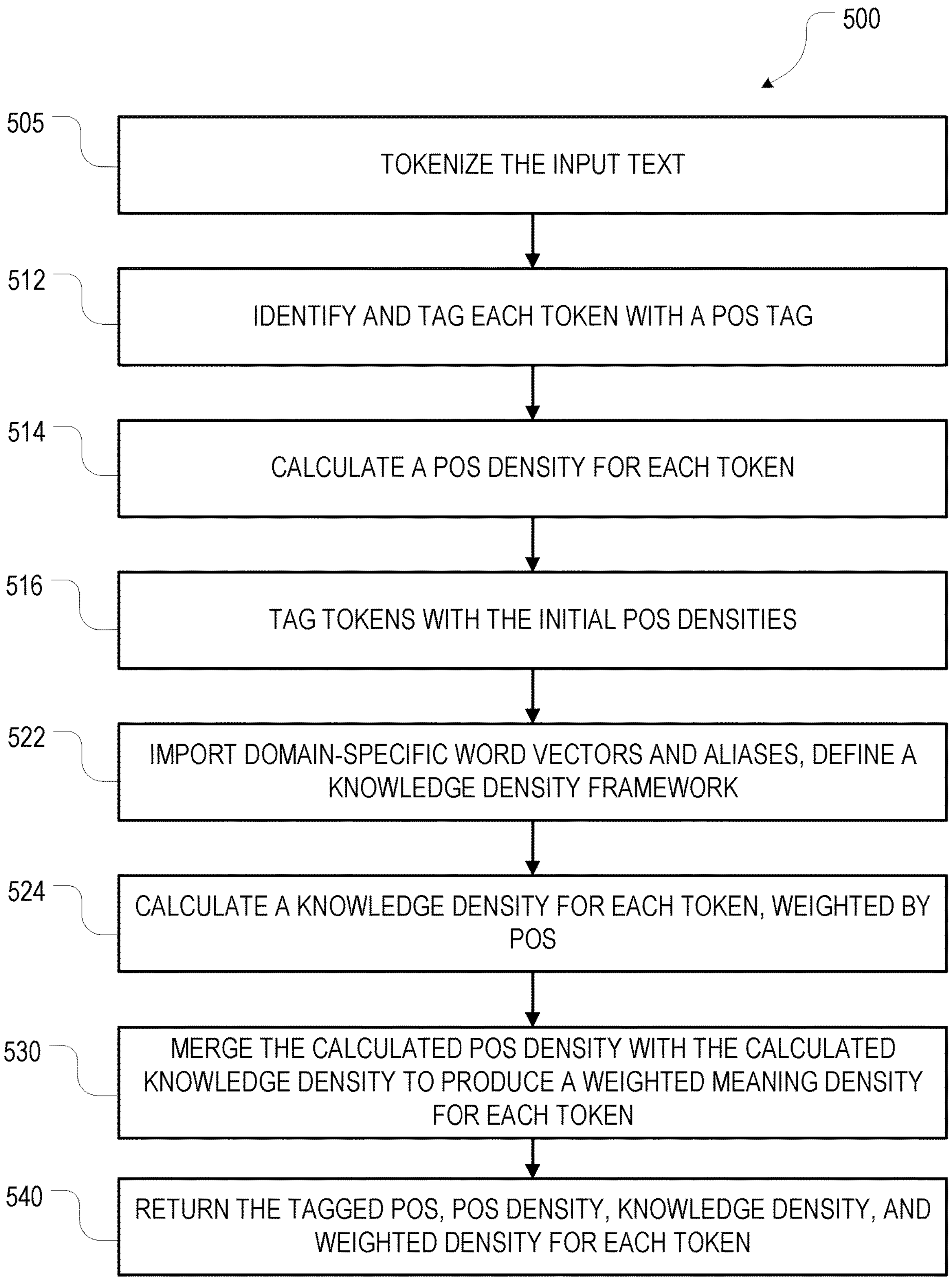
FIG. 5 is a flow chart showing the operation of a density calculator to determine weighted information density, consistent with some embodiments.

FIG. 5 is a flow chart 500 showing the operation of a density calculator 410 to determine weighted information density, consistent with some embodiments. This density calculator 410 in FIG. 5 may begin by tokenizing the input text (e.g., breaking up the input text into individual words and/or short phrases) at operation 505. The density calculator 410 may then calculate each token's initial ambiguity by parts of speech (POS density) at operations 512-516. This may include identifying and tagging each token with a POS tag at operation 512 using an appropriate POS tagging algorithm, such as rule-based POS tagging, transformation-based tagging, and stochastic tagging, etc. A suitable system of POS tags, in turn, is shown in Table 1.

TABLE 1

| | |
|---|---|
| CC | Coordinating conjunction |
| CD | Cardinal number |
| DT | Determiner |
| EX | Existential there |
| FW | Foreign word |
| IN | Preposition or subordinating conjunction |
| JJ | Adjective |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |
| POS | Possessive ending |
| PRP | Personal pronoun |
| PRP$ | Possessive pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund, or present participle |
| VBN | Verb, past participle |
| VBP | Verb, non-3rd person singular present |
| VBZ | Verb, 3rd person singular present |
| WDT | Wh-determiner |
| WP | Wh-pronoun |
| WP$ | Possessive wh-pronoun |
| WRB | Wh-adverb |

The density calculator 410 may then calculate a POS density for each token according to a POS density multiplier and the POS tag at operation 514. One illustrative POS density multiplier is shown in Table 2.

TABLE 2

| |
|---|
| 3: High importance for meaning representation, e.g., POS tags NN, NNP, NNPS, NNS, VB, VBD, VBG, VBN, VBP, VBZ) |
| 2: Medium importance for meaning representation, e.g. adjective, numbers, e.g., POS tags JJ, JJR, JJS, RB, RBR, RBS |
| 1: Low importance for meaning representation, e.g. prepositions, . . . e.g., POS tags CC, CD, DT, EX, IN . . . ) |
| 0: Punctuation |

The density calculator 419 may then tag the tokens with the initial POS densities at operation 516.

Next, the density calculator 410 updates initial ambiguity using a knowledge density factor for each token. In one embodiment, the knowledge density factor may be related to the number of definitions of each token, leveled by POS (e.g., compared to average for the POS), at operations 522-524. This may include importing a list of domain-specific word vectors and aliases and/or defining a knowledge density framework at operation 522. Next, at operation 524, the density calculator 410 may calculate the knowledge density for each token, weighted by the identified POS. One illustrative knowledge density multiplier is shown in Table 3.

TABLE 3

| |
|---|
| 0.3: High importance for meaning representation, |
| e.g., |
| "use": 6 definitions/average 4 definitions per verb |
| "Roller": definitions/average 5 definitions per noun |
| 0.2: Medium importance for meaning representation |
| e.g., |
| "Fluffy": 1 definitions/average 3 definitions per adjective |
| 0.1: Low importance for meaning representation, |
| e.g., |
| "a": 1 definition/average 2 definitions per determiner |
| 0.0: Punctuation(s) |

Next, the density calculator 410 may merge the calculated POS density with the calculated knowledge density to produce a weighted meaning density for each token at operation 530. For example, using the input phase in Example 1 above, the density calculator 410 may create the following weighted density array:

Example 4:

1.a [token] Use, a, fluffy, roller, barely, dipped, in, lighter, paint, .

1.b [part of speech] VB, DT, JJ, NN, RB, VBD, IN, JJ, NN, .

1.c [POS density] 3, 1, 2, 3, 2, 3, 1, 2, 3, 0

2[knowledge density] 0.3, 0.1, 0.2, 0.3, 0.2, 0.3, 0.1, 0.2, 0.3, 0.0

3[weighted density] 0.9, 0.1, 0.4, 0.9, 0.4, 0.9, 0.1, 0.4, 0.9, 0.0

Similarly, using the input phrase in Example 2 above, the density calculator 410 may create the following weighted density array:

Example 5:

1.a [token] I, want, to, end, jobs, in, the, risk, group, 106.

1.b [part of speech] PRP, VBP, TO, VB, NNS, IN, DT, NN, NN, CD.

1.c [POS density] 1, 3, 1, 3, 3, 1, 1, 2, 3, 2, 0

2[knowledge density] 0.1, 0.1, 0.1, 0.3, 0.3, 0.1, 0.1, 0.2, 0.3, 0.2, 0.0

3[weighted density] 0.1, 0.3, 0.1, 0.9, 0.9, 0.1, 0.1, 0.4, 0.9, 0.4, 0.0

At operation 540, the density calculator 410 may return the tagged POS, POS density, knowledge density, and weighted density for each token in the input text.

Sememe Attacher

Figure 6:
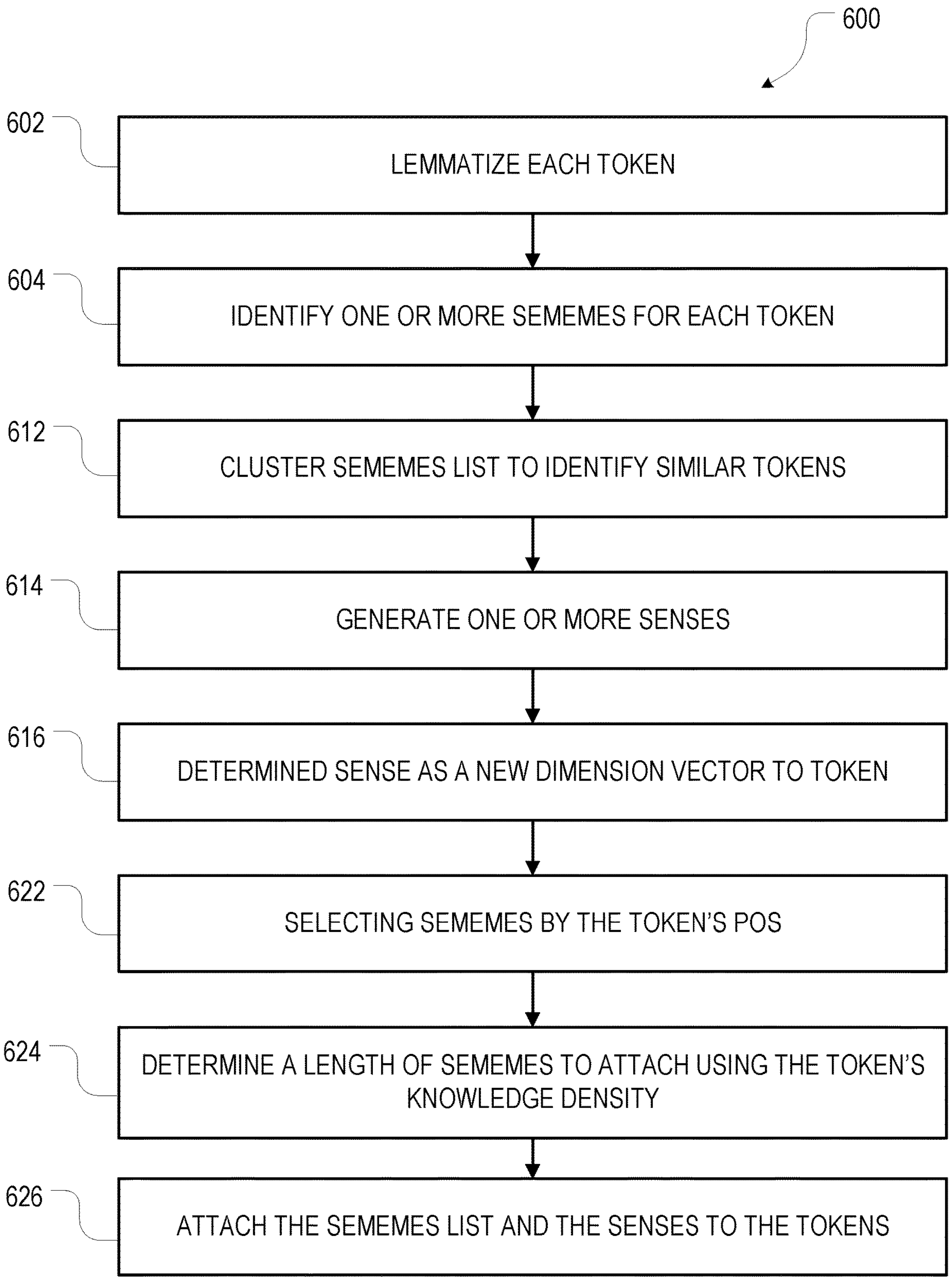
FIG. 6 is a flow chart illustrating the operation of a sememe attacher to build a sememes list for the token by parts of speech (POS) and knowledge density, consistent with some embodiments.

FIG. 6 is a flow chart 600 illustrating the operation of a sememe attacher 420 to build a sememes list for the token by POS and knowledge density, consistent with some embodiments. These embodiments may be desirable because they may include more contexts of information-dense words for improved accuracy. In operation 602, the sememe attacher 420 in some embodiments may first lemmatize each token (e.g., grouping together the inflected forms of a word so they can be analyzed as a single item). The sememe attacher 420 may then identify one or more sememes for each token, or token(s) with relatively higher density, at operation 604. This may include querying a dictionary for the sememe(s) associated with a particular token, using a rule-based system, etc. Continuing illustrative examples 1 and 2 above, operation 604 may produce the sememes list in Example 6 for the token "paint" in Example 1 above:

Example 6

绘画 (paint) 词性 (POS):verb ID:080257
涂抹 (paint) 词性 (POS):verb ID:163262
油漆 (paint) 词性 (POS):noun ID:194479
. . .

Similarly, operation 604 may produce the sememes list in Example 7 for the token "end" in Example 2 above:

Example 7

结束 (end) 词性 (POS):verb ID:090975
末 (end) 词性 (POS):noun ID:118949
完毕 (end) 词性 (POS):verb ID:165819
终结 (end) 词性 (POS):noun ID:208560
终止 (end) 词性 (POS):verb ID:208643
卒 词性 (POS):noun ID:214868
卒 (end) 词性 (POS):verb ID:214869
. . .

Next, the sememe attacher 420 may integrate domain-specific sememes with word vectors at operations 612-616. This may include using cluster analysis on the sememes list (identified at operation 604) to identify similar tokens at operation 612. The sememe attacher 420 may then use the similar token clusters to generate one or more senses (e.g., a semantic field) corresponding to the sememes cluster at operation 614. The sememe attacher 420 may then add the determined sense as a new dimension vector to tokens at operation 616.

Next, the sememe attacher 420 may attach the sememes and identified senses to the token by POS and by knowledge density at operations 622-626. This may include selecting sememes by the token's POS at operation 622. The sememe attacher 420 may then determine a length of sememes to attach using the token's knowledge density at 624. The sememe attacher 420 may then attach the sememes list and the senses to the tokens at operation 626.

Continuing the two illustrative examples above, the method in flow chart 600 may result in:

Example 8:

[token] Use, a, fluffy, roller, barely, dipped, in, lighter, paint, .

[part of speech] VB, DT, JJ, NN, RB, VBD, IN, JJ, NN, .

[density] 0.9, 0.1, 0.4, 0.9, 0.4, 0.9, 0.1, 0.4, 0.9, 0.0

[sememe] [action] [/] [*texture] [*tool] [way] [action] [/] [sight] [*material] take light grind only,just put, into visible coating hold air [machine] short, sink, liquid bright surface consume press,route simple pale Example 9:

[token] I, want, to, end, jobs, in, the, risk, group, 106.

[part of speech] PRP, VBP, TO, VB, NNS, IN, DT, NN, NN, CD, .

[density] 0.1, 0.3, 0.1, 0.9, 0.9, 0.1, 0.1, 0.4, 0.9, 0.4, 0.0

[sememe] [/] [action] [/] [action] [*job] [/] [/] [*name] [*group]

[number]request finish plural risk single 106 terminate where *texture, *tool, *material, *job, *name, and *group represent senses for fluffy, roller, paint, jobs, risk, and material, respectively.

Context Translator

Figure 7:
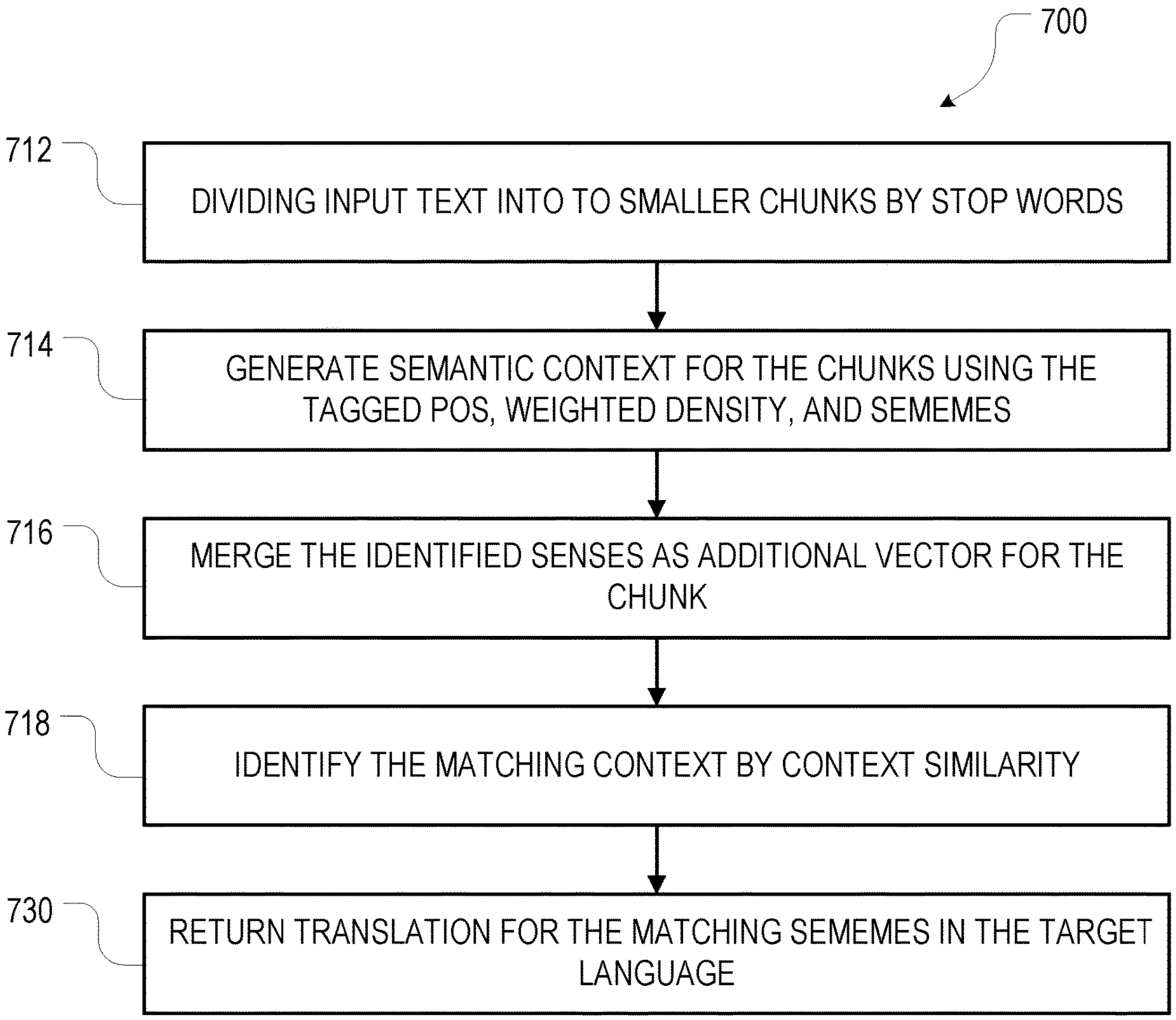
FIG. 7 is a flow chart illustrating the operation of a context translator to translate the input text as it generates and updates the semantic context, consistent with some embodiments.

FIG. 7 is a flow chart 700 illustrating the operation of a context translator 430 to translate the input text as it generates and updates the semantic context, consistent with some embodiments. At operations 712-718, the context translator 430 may generate sub-context and update the context at stop words. This may include dividing the sentences in the input text into to smaller chunks at operation 712. These chunks may be demarcated at the stop words (e.g., conjunctions, prepositions) in the original text. Next, the context translator 430 may use the tagged POS, weighted density, and sememes to generate semantic context for the smaller chunks at operation 714. This may further include merging the identified senses as an additional vector for the chunk. The semantic context optionally may be also added to the identified chunks as a header to the context vector at operation 716.

The context translator 430 may then identify the matching context by context similarity at operation 718. This may include identifying context by word use (frequent followers/predecessors), with greater attention on any nouns. Continuing the illustrative examples, the output of the context translator may be:

Example 10

[token] Use, a, fluffy, roller, barely, dipped, in, lighter, paint.
[part of speech] VB, DT, JJ, NN, RB, VBD, IN, JJ, NN.
[sub-context] [action] [*texture, *tool] [way, action] [color, *material]
[semantic context] take, hold->(texture tool) light, grind->(way action) simple, short, put, into, sink->(color) pale, coating, spread
Translation 使用 -> 蓬松柔软的滚筒 -> 轻蘸-> 浅色油漆

Example 11

[token] I, want, to, end, jobs, in, the, risk, group, 106.
[part of speech] PRP, VBP, TO, VB, NNS, IN, DT, NN, NN, CD.
[sememe] [/] [action] [/] [action] [*job] [/] [/] [*name] [*group] [number]
request finish plural risk single 106 terminate
[sub-context] [action] [action, *job] [*name, *group]
[semantic context] request->(job action) terminate jobs->(job group) risk group 106
Command (request) [bstop (terminate, stop) I bkill (kill, finish, terminate)] -g (job group)/risk_group 106 (job group name)

At operation 730, the context translator 430 may return a translation for the matching sememes in the target language.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

GENERAL

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A machine translation system, comprising:

a ChatOps system, the ChatOps system adapted to receive a natural language input text from an end user and to generate one or more executable commands from the natural language input text, the ChatOps system comprising:

a density calculator, the density calculator adapted to:

tokenize the natural language input text into a plurality of word tokens;

calculate a part of speech (POS) density for the plurality of word tokens in the natural language input text;

calculate a knowledge density for the plurality of word tokens in the natural language input text;

level the calculated knowledge densities by POS; and calculate an information density for the plurality of word tokens in the natural language input text using the POS density and the leveled knowledge density;

a sememe attacher adapted to generate one or more corresponding sememes for one or more of the plurality of word tokens using their respective information densities; and a context translator adapted to translate the natural language input text into the one or more executable commands using the corresponding sememes, wherein the context translator is adapted to:

divide the natural language input text into a plurality of smaller chunks by stop words, the plurality of smaller chunks including one or more word tokens having one or more corresponding sememes attached thereto;

generate a semantic context for one or more of the smaller chunks using the one or more corresponding sememes, including:

cluster the word tokens using the corresponding sememes;

determine a sense for the clustered word tokens;

merge the sense with the corresponding sememes to generate a semantic context for one of the chunks; and using the semantic context to translate the chunk; and translate the natural language input text into the one or more executable commands using the semantic context.

2. The machine translation system of claim 1, wherein the density calculator is further adapted to return the information density for one or more of the plurality of word tokens.

3. The machine translation system of claim 1, wherein the sememe attacher is further adapted to:

generate one or more corresponding sememes for one or more of the plurality of word tokens having an information density above an average weighted information density for the natural language input text; and attach the generated one or more corresponding sememes to the associated one or more of the plurality of word tokens.

4. The machine translation system of claim 3, wherein the sememe attacher is further adapted to lemmatize the natural language input text.

5. The machine translation system of claim 3, wherein the sememe attacher is further adapted to generate the one or more corresponding sememes under its POS.

6. The machine translation system of claim 3, wherein the sememe attacher is further adapted to return a list of sememes for one or more of the plurality of word tokens.

7. The machine translation system of claim 1, wherein the context translator is further adapted to identify a context by word use.

8. The machine translation system of claim 1, wherein the context translator is further adapted to return one or more of the corresponding sememes in a target language.

9. A ChatOps system, comprising:
- a plurality of client devices; and
- a machine translation system operably connected to the plurality of client devices and adapted to translate a natural language input text into one or more executable commands, the machine translation system comprising:
  - a density calculator, the density calculator adapted to:
    - tokenize the natural language input text into the plurality of word tokens;
    - calculate a part of speech (POS) density for one or more of a plurality of word tokens in the natural language input text;
    - calculate a knowledge density for one or more of the plurality of word tokens, wherein the knowledge density is leveled by POS;
    - calculate an information density for one or more of the plurality of word tokens using the POS density and the knowledge density; and
    - return the calculated information density for the one or more of the plurality of word tokens;
  - a sememe attacher, the sememe attacher adapted to:
    - lemmatize the natural language input text;
    - generate one or more corresponding sememes under the POS for one or more of one or more of the plurality of word tokens using their respective calculated information densities;
    - attach the one or more corresponding sememes to the one or more word tokens;
    - return a list of sememes for one or more of the plurality of word tokens; and
  - a context translator, the context translator adapted to:
    - divide the natural language input text into a plurality of smaller chunks by stop words, the plurality of smaller chunks including one or more word tokens having one or more corresponding sememes attached thereto;
    - cluster the one or more word tokens using the corresponding sememes;
    - determine a sense for the clustered word tokens;
    - merge the sense with the corresponding sememes to generate a semantic context for one of the chunks;
    - use the semantic context to translate the plurality of smaller chunks into a target language; and
    - return the translation of the natural language input text into the one more executable commands.

10. A computer program product for a ChatOps system, the computer program product comprising a computer readable storage medium having program instructions embodied therewith, the program instructions executable by a processor to cause the processor to:
- receive a natural language input text from an end user;
- tokenize the natural language input text into a plurality of word tokens;
- calculate a part of speech (POS) density the plurality of word tokens in the input text;
- calculate a knowledge density for the plurality of word tokens in the natural language input text;
- calculate an information density for the plurality of word tokens in the natural language input text using the POS density and the knowledge density;
- generate one or more corresponding sememes for one or more of the plurality of word tokens using their respective POS density and knowledge density;
- attach the one or more corresponding sememes to the one or more of the plurality of word tokens; cluster the word tokens using the corresponding sememes;
- determine a sense for the clustered word tokens;
- divide the natural language input text into a plurality of smaller chunks by stop words, the plurality of smaller chunks including one or more word tokens having one or more corresponding sememes attached thereto;
- merge the sense with the corresponding sememes to generate a semantic context for one of the chunks; generate a semantic context for one or more of the smaller chunks using the one or more corresponding sememes; and
- translate the natural language input text into one or more executable commands using the semantic context, including using the semantic context to translate the chunks.

* * * * *